United States Patent [19]
Levine

[11] 4,172,555
[45] Oct. 30, 1979

[54] ADAPTIVE ELECTRONIC THERMOSTAT

[76] Inventor: Michael R. Levine, 2900 Heather Way, Ann Arbor, Mich. 48104

[21] Appl. No.: 908,388

[22] Filed: May 22, 1978

[51] Int. Cl.² ........................ F23N 5/20; G05D 23/00
[52] U.S. Cl. ................................... 236/46 R; 236/47; 236/15 BG
[58] Field of Search ............ 165/12; 236/46 R, 46 F, 236/46 E, 15 BG, DIG. 8; 340/309.1; 62/231; 219/492; 364/477, 118; 432/52

[56] References Cited

U.S. PATENT DOCUMENTS

| | | | |
|---|---|---|---|
| 3,964,676 | 6/1976 | Rooks et al. | 236/46 R |
| 3,979,059 | 9/1976 | Davis et al. | 236/91.6 |
| 3,988,577 | 10/1976 | Leitner et al. | 364/118 |

*Primary Examiner*—William E. Wayner
*Attorney, Agent, or Firm*—Krass & Young

[57] ABSTRACT

A thermostatic controller system for a building heating and/or cooling system (furnace) includes a stored program of desired temperatures which are to be attained within the building at predetermined times within a repetitive time cycle, such as a day. Differing environmental conditions externally of the building result in differing rates of change of temperature within the building upon operation of the furnace. In order to determine the optimum time to switch the system on to meet the next programmed increased temperature, the furnace is switched on and then off a short period of time later and the temperature change which results in the building as a result of that transient operation is measured. The time at which the furnace must be switched to attain the next programmed temperature is then determined as a function of the rate of temperature change as determined by the transient switching and the difference between the instantaneous and the future programmed temperature. Alternatively, the controller may calculate the rate of temperature change each time the furnace is turned on for normal building temperature modification and use the last stored value of that rate in the turn-on time calculation. The system attains an energy efficiency exceeding that of conventional thermostat systems.

15 Claims, 7 Drawing Figures

ADAPTIVE ELECTRONIC THERMOSTAT

BACKGROUND OF THE INVENTION

1. Field of the Invention

This invention relates to thermostatic controls for building heating and/or cooling systems and more particularly to such systems which adaptively modify their operation as a function of changes in the rate of temperature exchange between the building and its environment resulting from changed environmental conditions.

2. Prior Art

Thermostat control systems for heating furnaces and/or air cooling systems (hereinafter collectively referred to as "furnaces") of the type employed in residences and many commercial and industrial buildings generally include means for manually entering a desired temperature set point, means for measuring the actual temperature within the building, and means for switching the furnace on or off as a function of differences between the set point temperature and the actual temperature. The ideal or desired temperature within a building will usually vary over a repetitive time cycle such as day or week. For example, in a residence that is heated by a furnace it is usually desirable that the nighttime temperatures, when the occupants are normally sleeping, be lower than the day-time temperatures. Thermostats therefore have been devised in which the 24 hour day may be divided into two periods and different desired temperature set points may be programmed for each of the periods. My copending patent application Ser. No. 778,376 entitld "Electronic Thermostat" discloses a system including a digital memory for storing a lengthy schedule of desired temperatures for times within a repetitive cycle. The memory is interrogated by a digital clock to output a signal representative of the desired temperature set point at any time and this temperature is compared to the measured building temperature to control the operation of the furnace. This system allows the provision of relatively complicated time-temperature programs to accommodate to the practices of the occupants of the building.

In programming these systems the operator must estimate the rate of temperature change which occurs when the furance is switched on in order to meet important time temperature points. For example, suppose the residents of a house want to maintain a 60° F. night-time temperature but want to have the temperature increase to 70° when they arise at 7 a.m. In relatively warm weather, i.e., with an external temperature of 50° or so and no appreciable wind, the rate of heat transfer between the building and its environment will be relatively low and it may be possible to make the 10° temperature excursion from 60°-70° by starting up the furnace ½ hour before the temperature change must be completed, or at 6:30 am. In colder weather and with more wind the rate of heat transfer between the building and its environment will be increased and the furnace will have to be switched on at earlier times in order to meet the 7 am. schedule. On a windy day with a 10° F. external temperature it may be necessary to turn on the furnace of 5 am. in order to obtain the desired 10° internal temperature rise by 7 am. While the operator might adjust the programmed turn-on time seasonally or even daily to compensate for variations in the weather, more likely a single turn-on time will be programmed to accommodate the worst possible condition, and accordingly during warmer temperatures the 70° temperature will be attained before 7 am. and there will be some resulting waste of fuel. Since the lowest exterior temperatures usually occur during the early morning hours the resultant fuel waste can represent a substantial fraction of total fuel use. Additionally, the excessively warm early morning temperature may be uncomfortable for the sleeping residents.

A similar situation occurs during seasons when a cooling or air conditioning system is in use and a residence is unoccupied during the mid-day hours, but the residents desire to have a relatively cool temperature during the early evening hours. With a conventional single setting thermostat a temperature slightly higher than the desired evening temperature may be programmed before the residents leave and when they return in late afternoon the set point may be lowered to the desired temperature. With a multiple set point system the thermostat may be programmed to a relatively high set point during the hours that the building is unoccupied and the lower desired temperature may be programmed for a time beginning before the residents return. Again, the initiation of this precooling period to attain the desired occupancy temperature will typically be based on the programmer's estimate of the time required to lower the temperature from the afternoon setting to the occupancy setting under the worst circumstances. During periods when the temperature difference between the interior and the exterior is relatively minor, and accordingly there is a low rate of heat exchange between the interior and the exterior, this precooling period will prove to be excessively long and the building will be maintained at a cooler than necessary temperature for some period of time during the late afternoon, the hottest time of the day.

SUMMARY OF THE INVENTION

The present invention makes use of the fact that a thermostat system has the available sensory inputs and output controls to determine the instantaneous rate of heat transfer between the building and its environment with a good degree of accuracy and that the low cost of mass produced electronic systems allows the provision of circuitry for utilizing these facilities to determine the instantaneous rate of transfer at a very low cost.

Broadly, the present invention relates to the method of adjusting the onset time of a preheating or precooling period required to achieve scheduled time/temperature points involving switching the temperature modifying apparatus (furnace) on for a short period of time before the earliest time that it may be required to turn on the furnace permanently in order to attain the scheduled temperature. During this transient operating period the resulting temperature change is examined to determine the instantaneous heating or cooling rate. Based on this rate and the temperature differential between the existing temperature and the future programmed temperature point, the time at which the furnace is turned on is controlled so that the building temperature reaches the scheduled point at substantially the scheduled time.

The preheating or precooling period will thus vary as a direct function of the rate of heat exchange between the interior of the building and the exterior; the preheating time will be large during very hot or very cold periods when there is a high rate of heat exchange between the building and the environment and will be low when there is relatively little difference between the interior and exterior temperatures and accordingly, a high percentage of furnace energy is retained.

The invention is also directed toward apparatus for practicing this adaptive method which includes control circuitry for examining the time/temperature program to recognize the need for a preheating or precooling cycle, means for initiating the transient operating cycle, means for examining the change in ambient temperature that occurs during the transient cycle and means for calculating the time of start of the preheating or precooling cycle as a function of the transient time, the transient temperature change and the required temperature excursion.

In addition to achieving improved thermal efficiency over conventional thermostat systems, the method and system of the present invention allow the programmer to ignore the preheat or precool times and simply to program the true desired temperature at each time. In an alternative embodiment of the invention the programmer may include a time listing in the program schedule for the occurrence of a transient operating signal cycle, relieving the circuitry of the burden of recognizing the need for a transient determination and for initiating it.

In another alternative embodiment of the invention, hereinafter described in detail, the rate of temperature change in the building is measured during a normal heating or cooling period rather than during an artificial transient.

A thermostat formed in accordance with the present invention may be used to directly replace a conventional single set point thermostat by simply making connection to the wires joining the convention thermostat to the temperature control apparatus. The system derives its operating power from these furnace control lines and embodies a solid state temperature sensing element, eliminating the need for troublesome hard thermostatic contacts. The system preferably employs integrated circuit electronics and may employ a microcomputer having a stored program which directs the system through the required adaptive thermostat tasks. Like the system of my previous patent this thermostat may incorporate a digital display for time, date and temperature.

Other objectives, advantages and applications of the present invention will be made apparent by the following detailed description to these preferred embodiments. The description makes references to the accompanying drawings in which.

Figure 5:
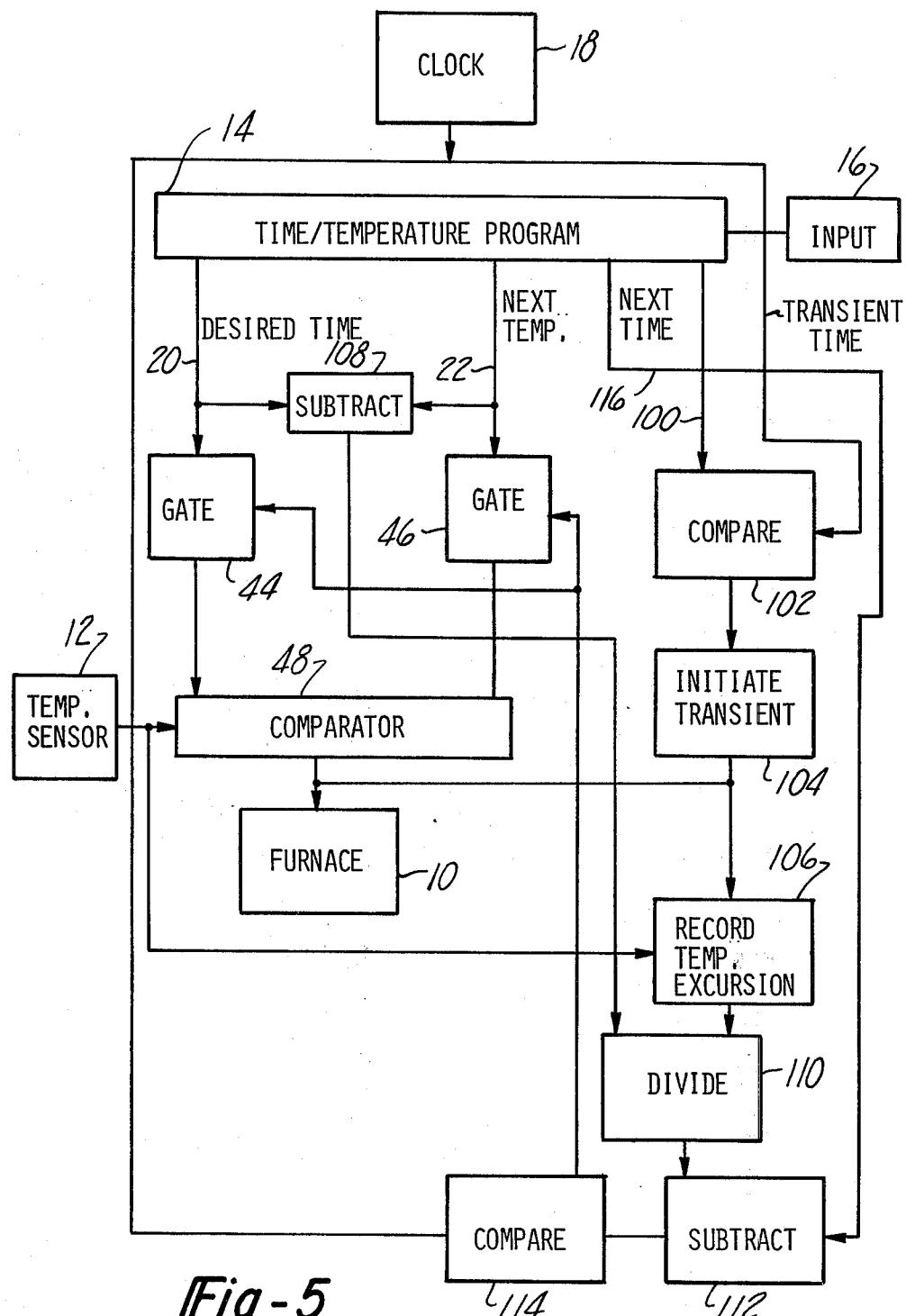
Figure 6:
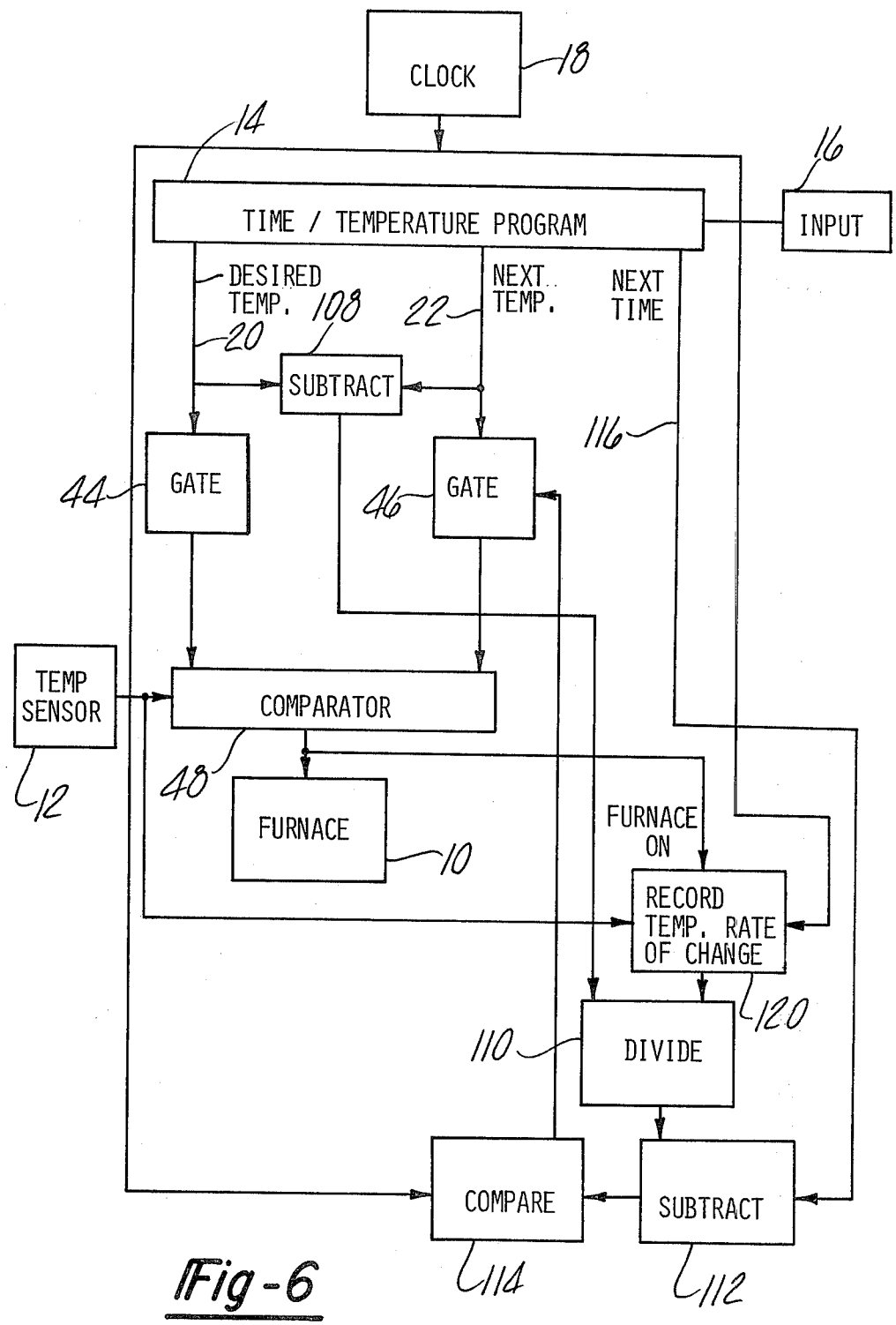

FIG. 5 is a schematic diagram of a heating system representing a second embodiment of the invention wherein the time of initiation of transient excursions is programmed by the operator in the time/temperature program; and FIG. 6 is a schematic diagram of a heating system representing a third embodiment of the invention wherein the rate of temperature increase is determined from operation of the normal heating cycle.

Figure 1:
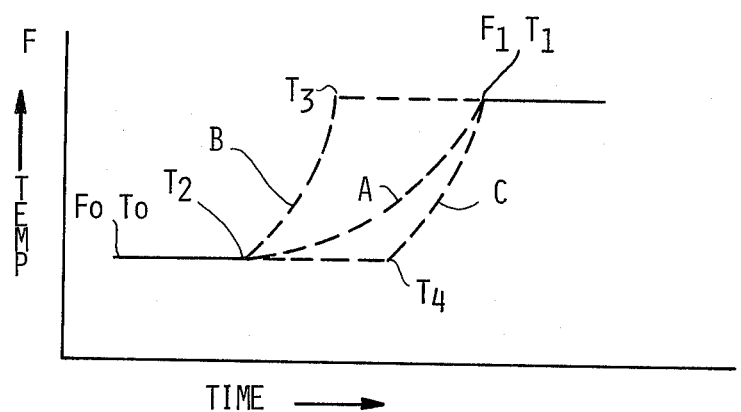
FIG. 1 is a graph of building temperature versus time illustrating the fuel inefficiency of programming the maximum required preheat time in accordance with the method of the prior art.

Referring to FIG. 1 consider a building such as a residence, heated by a furnace, in which it is desired to have a building temperature $F_0$ at a first time $T_0$. At a later time $T_1$ it is desired to have a higher temperature, $F_1$. Assume further that on the coldest, windiest day the building may experience, the rate of heat rise follows the curve A when the furnace is turned on from the temperature $T_0$. In order to achieve the higher temperature $F_1$ at the time $T_1$ it is necessary to permanently turn on the furnace at $T_2$ (the furnace may have been cycling on and off in order to maintain the temperature $T_0$). When the exterior temperature is relatively close to the temperature $F_1$, and there is little wind, there will be a relatively low rate of temperature loss to the exterior and the temperature rise in the building $F_0$ and $F_1$ will follow the steeper curve B. If the furnace is turned on permanently at time $T_2$, the programmed temperature of $F_1$ will be attained at a time $T_3$ which occurs before $T_1$. Under these circumstances it would be possible to delay the permanent turn-on time of the furnace until a time $T_4$ where $T_4 = T_2 + (T_1 - T_3)$. The temperature rise in the building would then follow the curve C which has the same shape as the curve B and thus attain the programmed temperature $F_1$ at $T_1$.

When a programmed thermostat system of the prior art is employed it is necessary to program the permanent turn-on time of the furance at $T_2$ by effectively including a program point of $F_1$ at $T_2$ (In terms of the previous example in which it is desired to obtain a 70° temperature at 7:00 am., the system is programmed for a 70° temperature at 5:00 am. to meet the worst possible conditions). The area between the curves B and C represents wasted heat energy.

With the system of the present invention the low rate of heat transfer with the exterior would be sensed by the system and the system would turn the furnace permanently on at $T_4$ on very warm days, on $T_2$ on the coldest days and at times in between during other weather conditions in order to obtain the temperature $F_1$ at $T_1$.

Figure 2:
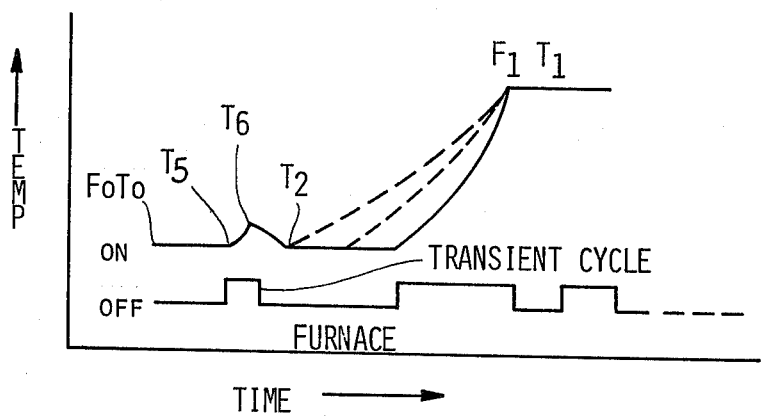
FIG. 2 is a graph of building temperatures versus time illustrating the manner of operation of the method of the present invention to adaptfully determine and modify the preheat time of the system.

FIG. 2 illustrates the manner in which the system of the present invention operates in order to adjust the programmed turn-on time from a temperature $F_0$ at time $T_0$ to attain a higher temperature $F_1$ at a time $T_1$. At some time $T_5$ which occurs before $T_2$, the earliest necessary time for turning on the furnace in order to attain temperature $F_1$ at $T_1$ under the worst possible heat exchange conditions, the furnace is turned on for a short, transient time period. This time may be predetermined, i.e., one minute, two minutes, etc., or it may be continued until the temperature sensed by the thermostat has increased by a predetermined small value, i.e., one degree, two degrees, etc. These are alternative modes of operation for the system. After the attainment of the predetermined short time or temperature increase, the furnace will be turned off at $T_6$. The system will then calculate the rate of temperature increase upon turn-on of the furnace, by dividing the measured temperature at $T_6$ by the time $T_6 - T_5$. The system will then calculate the necessary turn-on time in order to attain temperature $F_1$ at time $T_1$. (During the time between $T_6$ and the calculated turn-on time the furnace may cycle on and off in order to maintain the previously programmed temperature $T_0$, but this is not illustrated in FIG. 2.) A similar operation will take place with a cooling system but the temperature gradient from $T_0$ to $T_1$ would be reversed.

Figure 3:
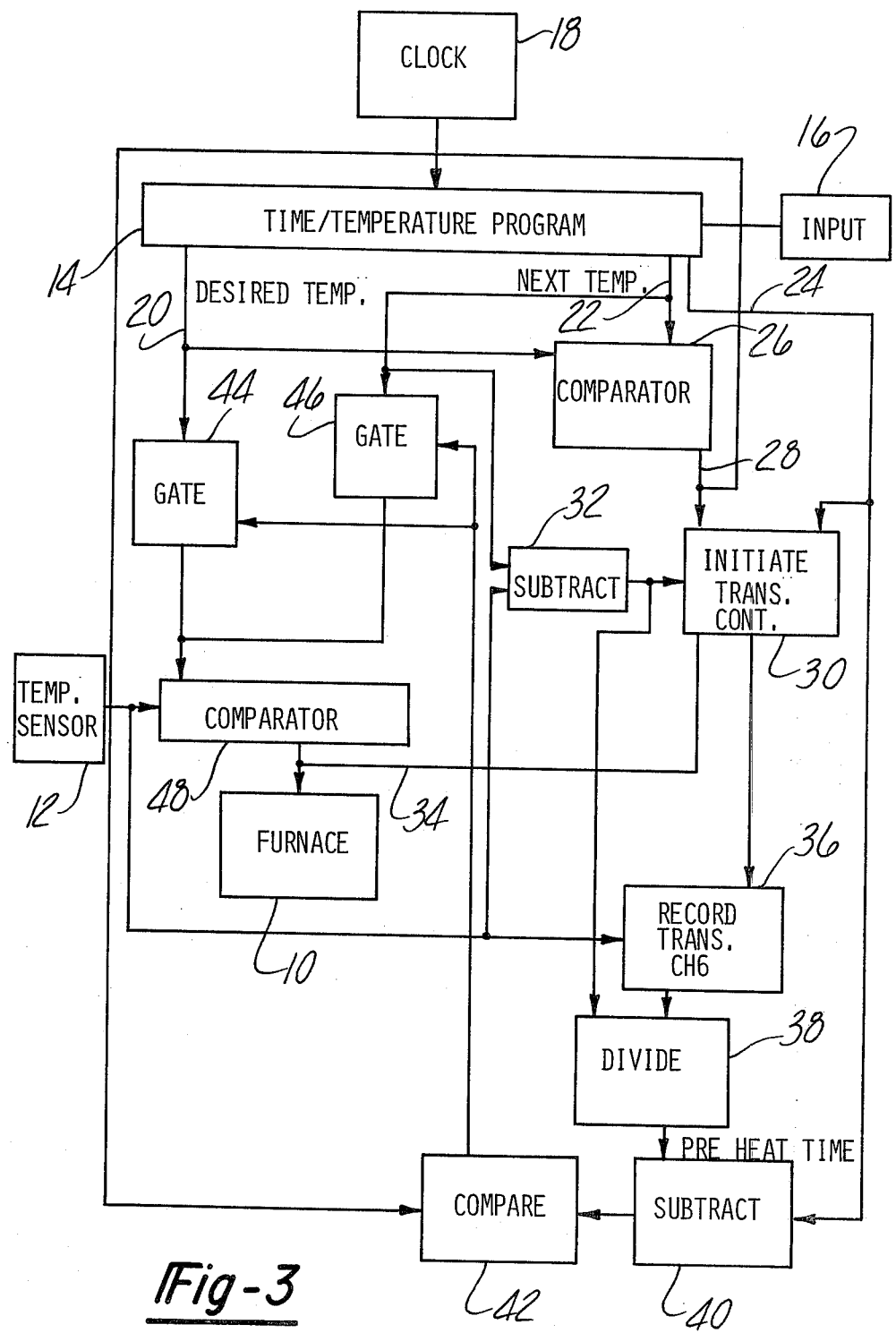
FIG. 3 is a schematic diagram of a first embodiment of a building heating system formed in accordance with the present invention.

FIG. 3 schematically illustrates a preferred embodiment of the invention for controlling a furnace 10. The embodiment of FIG. 3 may either take the form of a hard-wired digital electronic circuit or of a suitably programmed computer, preferably a microprocessor, along with associated peripheral units as will be indicated.

The system includes a temperature sensor 12 operative to output a digital signal having a value which is a function of the ambient temperature at the location of the sensor. Any of a variety of digital output sensors may be employed such as that disclosed in my copending application Ser. No. 778,376, or the sensor disclosed in Palmieri U.S. Pat. No. 3,942,718. The system further includes a digital memory 14 adapted to store a program of desired temperatures at different times within a repetitive time cycle such as a day or a week. For example, consider the following daily time schedule:

7:00 a.m.: 70°
10:00 a.m.: 65°
3:00 p.m.: 55°
6:00 p.m.: 65°
12:00 midnight: 55°

The memory 14 may be programmed by suitable input apparatus 16 such as pushbuttons or a keyboard.

A clock 18 provides a digital output representative of the time of day and also the day, week, date, month or season if the system is equipped to handle time cycles longer than a single day. The output of the clock 18 is provided to the memory program 14 and controls the memory address to output the digital signal representative of the last programmed temperature before the present time. For example, at 2:00 p.m. the clock will cause the memory to output a signal representative of the 65°, the temperature programmed for 10:00 a.m., on line 20. This represents the desired temperature at the time indicated by the clock 18. The time signal will also address the memory 14 to cause an output of the next scheduled temperature on line 22 and the time at which that temperature is to be attained on line 24. For example, at 2:00 p.m. the line 22 will carry the digital signal for the temperature of 55° and line 24 will carry the digital code for the time of 3:00 p.m. at which the 55° temperature is to be attained.

The desired temperature on line 20 and the next scheduled temperature on line 22 are provided to a comparator 26 which determines whether the next scheduled temperature will require a temperature increase from the scheduled temperature. If this is the case, it provides a high output on line 28. Otherwise, it provides a low output.

Line 28 is provided to a circuit 30 which initiates a transient heating condition when it senses a high output on line 28. The time at which this transient is generated is a function of the temperature excursion required between the present temperature and the next programmed temperature. This signal is derived by a circuit 32 which receives the next temperature signal from line 22 and the output of the temperature sensor 12 and subtracts the two. Its output is provided to the circuit 30 along with the next time signal on line 24 and the present time signal from the clock 18. The unit 30 generates a time constant which is proportional to the output of the subtractor 32 and subtracts it from the next time signal on line 24 to determine the time at which the transient should start. It compares this time signal with the present time signal and when the two are equal, circuit 30 provides a signal to the furnace 10 on line 34 which causes the transient operation of the furnace to be initiated. The circuit 30 also provides a signal to circuit 36 which records the output of the sensor 12 at the beginning of the transient time and at the end of it. In the preferred embodient of the invention the transient occurs for a predetermined period of time. Alternatively, the transient could occur until the temperature sensor 12 indicates a predetermined increase in temperature.

The circuit 36 records the output of the temperature sensor 12 at the beginning and at the end of the transient and based on the temperature change and the time of the transient it calculates the rate of temperature change while the furnace is on and provides that signal to a divider 38 which also receives the output of the subtractor 32, representative of the temperature difference between the next temperature and the present temperature. Using a signal from the box 32 as a dividend and the signal from the unit 36 as a divisor, the circuit 38 determines the time required to heat the building from the existing temperature to the desired temperature. This time signal is provided to a subtractor 40 which also receives the signal on line 24 representing the programmed time of the next temperature point. It subtracts the calculated heat time from the next time signal to determine the time at which the preheat should start. This signal is provided to a comparator 42 which also receives the output of the clock 18. When the two signals are equal, switching signals are provided to a pair of gates 44 and 46.

The gate 44 receives the desired temperature signal on line 20 and provides its output, when suitably gated, to a comparator 48. The gate 46 receives the next temperature signal on line 22 and when suitably gated provides this signal to the comparator 48. The gates are arranged so that one is opened when the other is closed. Initially, the gate 44 is open so that the present desired temperature on line 20 is provided to the comparator 48. When the comparator 42 recognizes the time of beginning of the preheat time a signal is provided to the two gates closing gate 44 and opening gate 46 and thus providing the next temperature to the comparator 48. The comparator 48 operates to compare either the desired temperature from gate 44 or the next temperature from gate 46 with the present temperature as encoded in the output of the temperature sensor 12. The comparator provides controlling output signals to the furnace 10 based on the difference between the measured and the required temperature in the manner of a conventional thermostat.

Figure 4A:
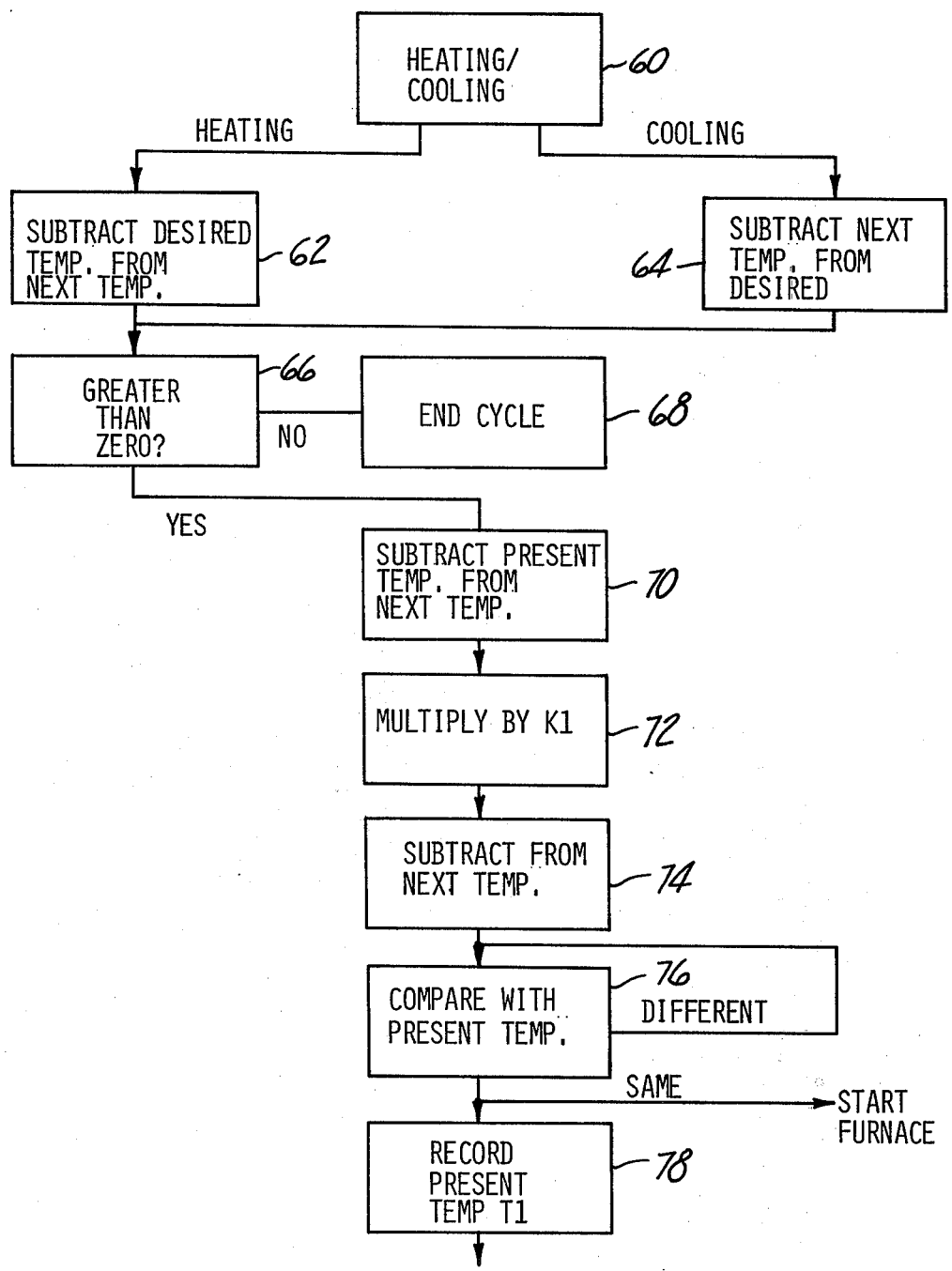
FIGS. 4a and 4b are two halves of a flow chart illustrating the manner of operation of the system in FIG. 3 or of a program for a program controlled computer embodiment of the system of FIG. 3.
Figure 4B:
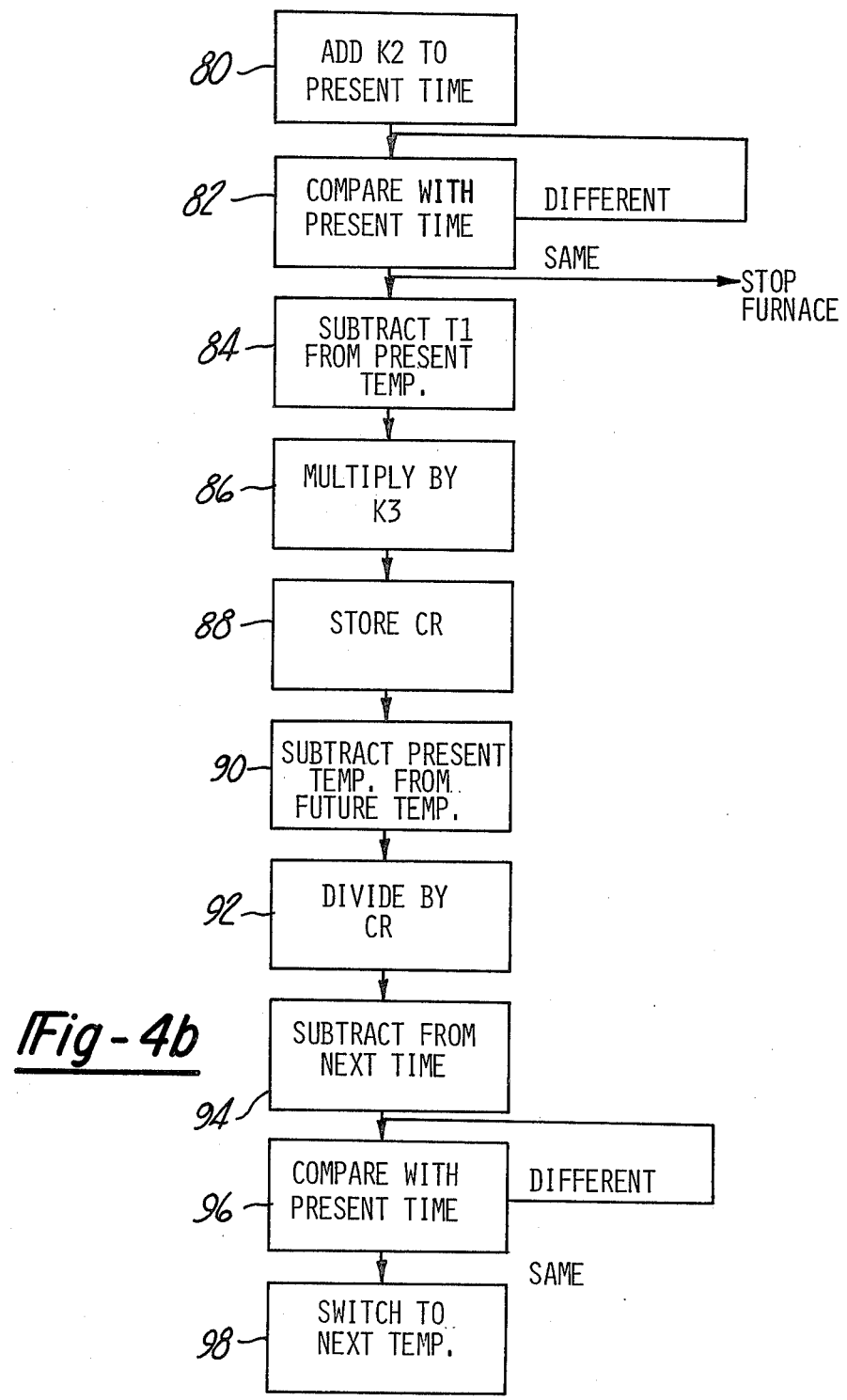

The operation of the apparatus of FIG. 3 is illustrated by the flow chart of FIG. 4. This flow chart could also be considered the outline of a program for a programmable computer based embodiment of the invention.

The apparatus first makes a determination as to whether it is in the heating or cooling mode based on signals from appropriate switches (not shown), by detection of the nature of the last temperature modifying operation (either heating or cooling) and storage of a code representative of that operation, or by examination of the stored time/temperature program to determine the temperature stored for a particular time such as midnight. If that stored temperature exceeds a stored value, such as 65° the system is considered to be in the cooling mode and if the stored temperature at the particular time is below 65° the system is considered to be in the heating mode. This determination, indicated by the block 60, provides output to block 62 if the system is in the heating mode or output to a block 64 if the system is in the cooling mode. Block 62 represents the operation of subtracting the desired temperature from the next temperature to determine whether the furnace must be turned on to meet the next temperature point. Similarly the operation in block 64 involves subtracting the next temperature from the desired temperature to determine if the air conditioning should be turned on to meet the next scheduled temperature point.

The outputs of both blocks 62 and 64 are provided to a block 66. If neither of the inputs to the block 66 are high an output is provided which ends the operation of the cycle since no preheating or precooling time is required. This is represented in block 68. If the signal from either of blocks 62 or 64 is greater than 0, indicating the need for a precooling or preheating step, the system goes into an operative mode. The operative mode is illustrated only for the heating cycle. Block 70, which is controlled by the output of block 66, symbolizes the operation of subtracting the present temperature from the next temperature to determine the required temperature transient. A signal proportional to this temperature difference is multiplied by a constant in block 72 to provide a signal representative of the time at which the transient should be initiated. This is subtracted from the next time signal (line 24) in block 74 and the resulting time signal is compared with the present time in block 76. If they are different the comparison is repeated but when they are the same a signal is provided to start the furnace and the present temperature is recorded under control of block 78. Another constant is then added to the present time in block 80 to generate a time signal representative of when the transitient should terminate and this time signal is compared with the present time signal in block 82. The comparison operation is repeated as long as they are different and when they are the same a signal is sent to the furnace to cause the transient to stop.

The temperature excursion that occurs during the transient heating time is then calculated in block 84 and multiplied by a constant in block 86 to provide a time signal which is stored as represented by block 88. The present temperature is subtracted from the future temperature in block 90 to determine the temperature excursion required and this signal is divided by the rate signal stored in block 88 at block 92. This generates the preheat or precooling time required which is subtracted from the next time signal in block 94 to arrive at a preheat initiate time. In block 96 this time is compared with the present time and the comparison is repeated until they are equal. At that time the system is switched from the present desired temperature to the next temperature as exemplified by block 98.

In an alternative embodiment of the invention the time/temperature program may be equipped to record and store signals representative of the time of initiation of a transient preheat test. This relieves the circuit of the necessity of determining when a preheat is required and of calculating the time of initiation of the preheat. A schematic diagram of this embodiment is illustrated in FIG. 5. Like the system of FIG. 3, the system of FIG. 5 employs a digital temperature sensor 12, a time/temperature program 14, a clock 18 and a comparator 48 which compares the actual temperature with the commanded temperature to control a furnace 10. The system differs in that when interrogated by the digital clock 18, the time and temperature program outputs the desired temperature on line 20, the next temperature on line 22 and the time of occurrence of a temperature rate test transient, if one is required, on line 100. The programmer adds a transient time to the memory, when forming a program using the input 16.

The transient time signal on line 100 is provided to a comparator 102 which also receives the output of the clock 18. When the time for initiation of a transient equals the present time a signal is sent to a block 104 causing it to initiate the transient by energizing the furnace 10. A circuit 106 receives the output of the temperature sensor 12 and records the temperature at the beginning and the end of the transient.

A subtractor 108 receives the desired temperature signal on line 20 and the next temperature signal on line 22 and calculates the required temperature excursion. It provides a signal to a divider 110 which also receives the output of block 106 representative of the rate of heat change. The result is a time signal which is subtracted from the time of the next temperature on line 116 in block 112 to determine the time at which preheat must start. The comparator 114 receives the output of the circuit 112 and the output of the clock 18 and controls the pair of gates 44 and 46 which perform the same function as the circuit of FIG. 3.

Alternatively, the system may determine the instantaneous heating or cooling rate without initiating a transient cycle, simply by measuring the temperature change that occurs over a unit period of time when the furnace is operating to reduce the temperature difference between the measured building temperature and the last desired temperature encoded in the time/temperature schedule. In the previous example of the scheduled 60° F. night-time temperature and a 70° F. temperature at 7:00 am, assume that the furnace is turned on by the thermostat at 4:00 am, as a result of the measured building temperature falling below the 60° F. programmed level. The adaptive system will then measure the rate of heat increase occurring during this furnace-on time and use that value to schedule a turn-on time which will cause the house temperature to reach 70° F. at 7:00 am. If the furnace again cycles on to attain the 60° temperature prior to the calculated turn-on time, the system will recalculate the necessary turn-on time based upon the most recent measurement of the rate of heating. This arrangement avoids the switching and possible energy loss associated with the transient cycle of the alternative embodiment.

FIG. 6 illustrates a third embodiment of the heating system incorporating my invention which need not initiate a transient cycle of operation of the furnace in order to determine the rate of heat increase during operation of furnace but rather computes the rate of heat increase each time the furnace is caused to operate during its normal cycle and continually updates that rate. The system is much like that of FIGS. 3 and 4 and employs the same reference numerals as FIG. 3 for like subsystems.

A subsystem 120 receives signals from the clock 18 and from the temperature sensor 12. The output of the comparator 48 to the furnace 10 is also connected to the subsystem 120 and provides a high signal when the furnace is turned on. During this time the system 120 makes a calculation of the rate of temperature change in the building. This may be done on a digital basis by determining the changes that occur in the output of the temperature sensor over unit periods of time, such as degrees per minute.

This rate of change value is provided to the divider 110 in the same manner as the output of unit 106 in the system of FIG. 5. The divider 110 also receives the output of the subtractor 108 indicative of the differential between the present desired temperature and the next temperature and determines the time required to heat from the present temperature to the next temperature at the present rate of heat change. This time is subtracted from the time to the next temperature on line 16 in block 112 to determine the time at which preheating must start. This calculation of rate of temperature change proceeds continuously each time the furnace is on and continually updates the determination of time for initation and preheat.

The embodiments of the invention in which an exclusive property or privilege is claimed are defined as follows:

1. In a temperature control system for a building of the type including a temperature modifying apparatus having at least two distinct states of operation, and a thermostatic control wherein the system includes a stored program of representations of the desired temperatures to be maintained in the building at predetermined times in a repetitive time cycle, and means for measuring the temperature within the building, the improvement comprising: means for determining the rate of change of temperature which occurs within the building as a result of operation of the temperature modifying apparatus; and means for changing the state of the temperature modifying apparatus a period of time previous to the time stored in the program at which the next desired temperature stored in the program is to be attained, such period of time being a function of said determination of the rate of change in temperature within the building during operation of the temperature modifying apparatus.

2. The temperature control system of claim 1 wherein said means for changing the state of the temperature modifying apparatus a period of time previous to the time stored in the program at which the next desired temperature stored in the program is to be attained includes means for determining the time required to change temperature in the building from the existing temperature to the next desired temperature stored in the program at the rate of change of temperature determined by said means for determining the rate of change of temperature which occurs within the building as a result of operation of the temperature modifying apparatus.

3. The temperature control system of claim 2 wherein said means for determining the time required to change the temperature in the building from the existing temperature to the next desired temperature stored in the program includes means for receiving a signal from the stored program representative of the next desired temperature and an input from said means for measuring the temperature within the building, and includes means for determining the temperature change required from the existing temperature to the next desired temperature in the program.

4. The temperature control system of claim 1 wherein said means for determining the rate of change of operation of the temperature modifying apparatus includes an input from said means for measuring the temperature within the building, a clock operative to generate an electrical signal representative of time, and a signal representative of the state of operation of the temperature modifying apparatus, and said means for determining the rate of change of temperature which occurs within a building operates to measure the temperature change which occurs within the building during a measured period of operation of said temperature modifying apparatus.

5. In a temperature control system for a building of the type including a temperature modifying apparatus having at least two distinct states of operation, and a thermostatic control wherein the system includes a stored program of representations of the desired temperatures to be maintained in the building at predetermined times in a repetitive time cycle, and means for measuring the temperature within the building, the improvement comprising: means for generating a control signal for the temperature modifying apparatus causing it to change operating state for a relatively short length of time, means for determining the rate of change of temperature which occurs within the building as a result of such short change in operating state of the temperature modifying apparatus; and means for changing the state of the temperature modifying apparatus a period of time previous to the time stored in the program at which the next desired temperature stored in the program is to be attained, such period of time being a function of said determination of the rate of change in temperature within the building during operation of the temperature modifying apparatus.

6. The temperature control system of claim 1 wherein said relatively short change in operating state of the temperature modifying apparatus occurs for a predetermined length of time.

7. The temperature control system of claim 5 wherein said relatively short change in operating state of the temperature modifying apparatus terminates when a predetermined temperature change has occurred within the building.

8. The temperature control system of claim 5 wherein said stored program includes signals indicative of the time at which said relatively short change in operating state of the temperature modifying apparatus should be initiated.

9. The temperature control system of claim 5 wherein said temperature modifying apparatus is operative to change the temperature within the building in a first direction when in its operative state and said means for determining the time at which the thermostatic control should cause a change of operating state of the temperature modifying apparatus in order to attain the next desired temperature stored in the program is operative only at such times as the next desired temperature stored in the program is in said first direction relative to the present temperature stored in the program.

10. The temperature control system of claim 5 wherein the temperature modifying apparatus comprises a furnace and said means for determining the time at which the thermostatic control should cause a change of operating state of the temperature modifying apparatus in order to attain the next desired temperature stored in the program is only operative at such time as the next desired temperature stored in the program is higher than the present temperature stored in the program.

11. The temperature control system of claim 5 wherein the temperature modifying apparatus comprises air cooling apparatus and said means for determining the time at which the thermostatic control should cause a change of operating state of the temperature modifying apparatus in order to attain the next desired temperature stored in the program is only operative at such time as the next desired temperature stored in the program is lower than the present temperature stored in the program.

12. The method of adaptively controlling a temperature modifying apparatus having at least two distinct levels of operation in order to attain a programmed temperature within a building at a programmed future time, comprising: changing the state of operation of the temperature modifying apparatus for a relatively short period of time prior to the programmed future time, measuring the rate of change of temperature which occurs within the building as a result of said short change in operating state of the temperature modifying apparatus, and changing the state of the temperature modifying apparatus at a time prior to said programmed furture time which is a function of the rate of temperature change which occurred during said short change in state of the temperature modifying apparatus.

13. The method of adaptively controlling a temperature modifying apparatus of claim 12 including the steps of providing a stored program of representations of the desired temperatures to be maintained in the building at predetermined times in a repetitive time cycle as well as representations of the times within the cycle at which the change of state of operation of the temperature modifying apparatus for a relatively short period of time to determine the rate of temperature change which occurs in the building should be initiated.

14. The method of adaptively controlling a temperature modifying apparatus of claim 12 including the step of analyzing a program of desired temperatures to be attained within the building at predetermined times within a repetitive time cycle to determine the time at which at relatively short change in state of operation of the temperature modifying apparatus should be initiated in order to measure the rate of temperature change which occurs during said relatively short change of state.

15. In a temperature control system for a building including a temperature modifying device having an on state and an off state and a thermostatic control for the temperature modifying device including a building temperature sensor and a program storing a sequence of desired temperatures at particular times over a repetitive time cycle, the improvement comprising: means for controlling the time at which the temperature modified device is turned on in order to attain the next programmed temperature at the programmed time, said means including means for turning the furnace on for a short transient period; means for recording the temperature change occurring in the building as a result of said transient cycle; and means for initiating the on state of the temperature modifying device at a time which is a direct function of the rate of temperature change in the building during the transient period and the temperature excursion required from the existing temperature to the next scheduled temperature.

* * * * *